(12) United States Patent
Abernathy

(10) Patent No.: US 11,304,446 B1
(45) Date of Patent: Apr. 19, 2022

(54) SMOKING DEVICE WITH FILTERING, COOLING AND MAGNETIC BLUETOOTH CONNECTED SPEAKER AND GRINDER

(71) Applicant: Quillez Rhaheim Abernathy, Birmingham, AL (US)

(72) Inventor: Quillez Rhaheim Abernathy, Birmingham, AL (US)

( * ) Notice: Subject to any disclaimer, the term of this patent is extended or adjusted under 35 U.S.C. 154(b) by 203 days.

(21) Appl. No.: 16/439,672

(22) Filed: Jun. 12, 2019

(51) Int. Cl.
*A24F 1/30* (2006.01)
*A24F 1/06* (2006.01)
*H04R 1/02* (2006.01)
*H04W 4/80* (2018.01)

(52) U.S. Cl.
CPC ............... *A24F 1/30* (2013.01); *A24F 1/06* (2013.01); *H04R 1/028* (2013.01); *H04W 4/80* (2018.02)

(58) Field of Classification Search
CPC ... A24F 1/06; A24F 1/30; H04W 4/80; H04R 1/028
See application file for complete search history.

(56) References Cited

U.S. PATENT DOCUMENTS

| | | | |
|---|---|---|---|
| 2008/0029107 A1* | 2/2008 | Ruff | A24F 1/30 |
| | | | 131/173 |
| 2010/0126517 A1* | 5/2010 | Groff | A24F 1/30 |
| | | | 131/173 |
| 2014/0130812 A1* | 5/2014 | Kling | A24F 1/30 |
| | | | 131/173 |
| 2017/0143035 A1* | 5/2017 | Pucci | H04W 4/80 |
| 2018/0317544 A1* | 11/2018 | Hagen | A24F 1/30 |
| 2018/0317546 A1* | 11/2018 | Rial | A24F 1/30 |
| 2020/0178598 A1* | 6/2020 | Mitchell | A61L 9/03 |

* cited by examiner

*Primary Examiner* — Ryan A Reis
(74) *Attorney, Agent, or Firm* — Hulsey P.C.

(57) ABSTRACT

The present invention is a device used to filter and cool tobacco smoke. The device burns dry tobacco and then cleans and cools the smoke before it is delivered to the lungs of the user. The present invention uses an electric fan in the body of the pipe which creates a spinning vortex in the water. The vortex subsequently cleans and filters the tobacco smoke rapidly and efficiently via water diffusion all while keeping the tobacco in the bowl lit. This process results in a smooth and cool toke delivered to the user.

4 Claims, 12 Drawing Sheets

SMOKING DEVICE WITH FILTERING, COOLING AND MAGNETIC BLUETOOTH CONNECTED SPEAKER AND GRINDER

BACKGROUND OF THE INVENTION

According to Caroline Cobb, "Water pipe tobacco smoking is a centuries-old tobacco use method with an ambiguous origin and links to the countries of southwest Asia and North Africa. Although known by many different names (eg, hookah, narghile, shisha), the term water pipe has been used for the last 2 decades in the English language scientific literature to refer to any of a variety of instruments that involve passing tobacco smoke through water before inhalation."

The present invention is a device use to filter and cool tobacco smoke. The device burns dry tobacco and then cools and cleans the smoke before it is carried to the user. The present device also facilitates a magnetic connected grinder and a wireless Bluetooth speaker.

The present invention is in the technical field of water filter pipes, more particularly, the present invention is in the technical field of tobacco and *Cannabis* smoking pipes.

Traditional water pipes that are used by tobacco smokers do not clean the tobacco smoke completely because the water is still. Although conventional water pipes help filter out dense ash debris, there are still many micro-carcinogens, as well as tar that still reach the users lungs.

Because most tobacco water pipes use "still" water, the pipe holds most of the toxins, and also becomes contaminated more often, which results in decrease filtering efficiency. Traditional water pipes can come in a variety of different shapes but most are usually made with glass which is very fragile and easy to break. In addition to shape, traditional tobacco water pipes are made with a large apparatus and stem-bowl design. The design allows the users to burn the tobacco in the bowl near the bottom of the pipe, however the users has to lean over to positon their mouth over the apparatus which results in more difficult toke. Hookah style pipes are very smooth and simple to use from a design aspect. While hookah smoke is less irritating to the throat, it still contains tar, carbon monoxide and nicotine. It has been shown that the smoothness of the hookah smoke actually encourages users to inhale more deeply and use for a longer period of time causing greater exposure to harmful elements. (cesar.umd.edu)

SUMMARY OF THE INVENTION

The present invention uses an electric motor and fan in the body of the device which creates a spinning vortex or cyclone in the water. The vortex subsequently cleans and filters the smoke or vapor rapidly and efficiently all while keeping the content in the bowl lit. This process results from a small motor which spins a fan breaking the surface tension of the water and diffusing the smoke through the water rapidly. The present invention also includes a spinning percolator which helps cool down the smoke by creating tiny bubbles through pores located on the side of the percolator which results in the smoke being cooled and filtered, to deliver a smooth toke to the user.

The present device includes an aerator design mouthpiece which delivers the tobacco smoke perpendicular to the user by channeling the smoke through a line of holes around the end of the stem. This allows for gaseous material to flow through while leaving larger particles such as tar behind in the bowl of the mouthpiece before inhalation. This process results in tar reduction by distributing the tar on the outer rim of the mouthpiece. This helps decrease tar stains on the user's lips and lungs.

The present invention is a device used to filter and cool tobacco smoke. The invention features a motorized fan which spins the water in the chamber, and as the smoke passes through the body of the device and into the water the smoke is filtered and cooled rapidly. The invention facilitates a rotating percolator which creates small bubbles in the water thus cooling the smoke further before it is delivered to the user's lungs.

DETAILED DESCRIPTION OF THE INVENTION

Figure 1:
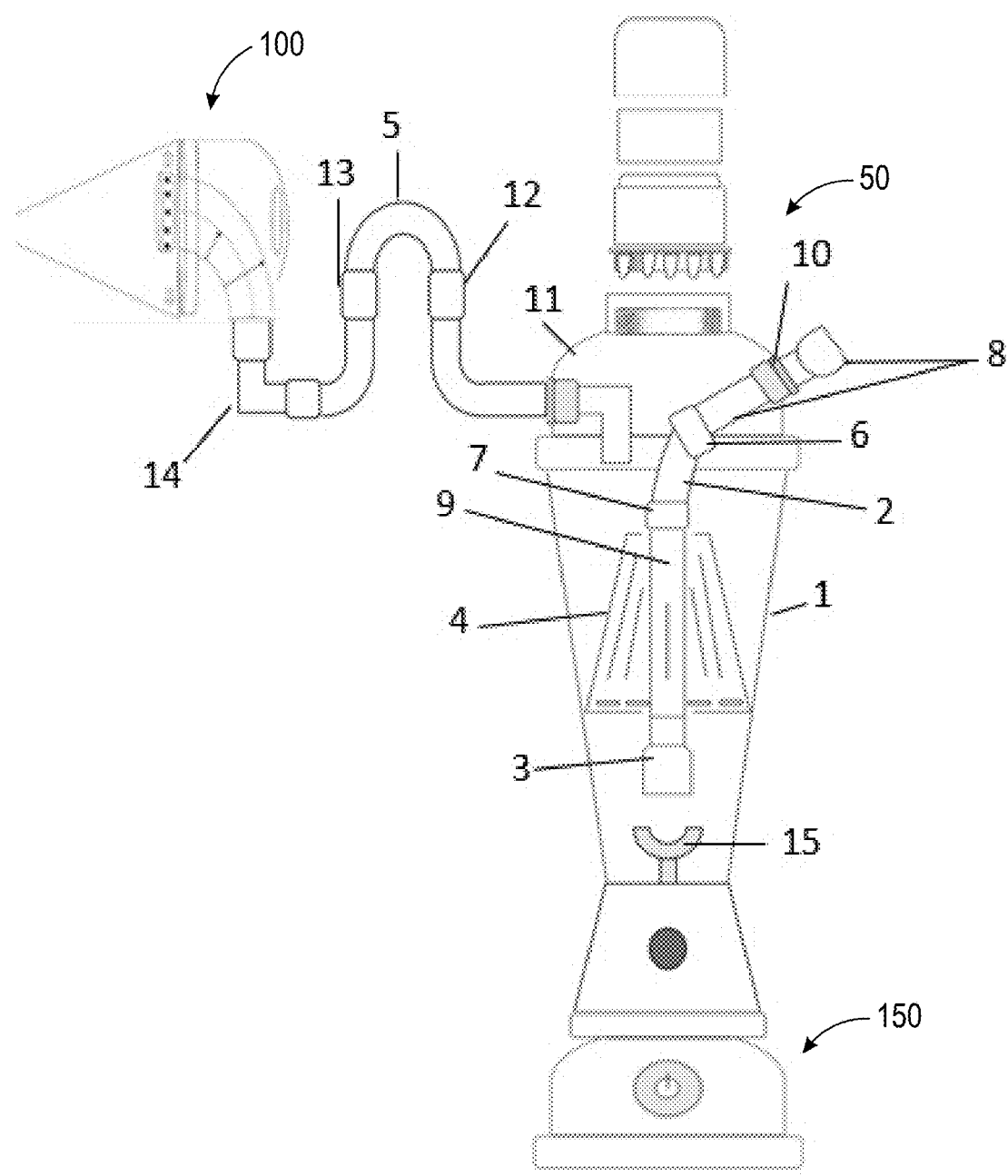
FIG. 1 is a perspective view of the present invention;
2)

Referring now to the invention in more detail, in FIG. 1 there is shown a smoking device used for filtering and cooling smoke. There is shown in FIG. 1. Component-1 the body or container 1 of the invention, integrated and aligned with a copper stem-9 and curved apparatus-5. The body 1 connects to a grinder assembly 50, mouthpiece 100 and housing unit 150. The stem-9 is attached with the percolator-4 (a modified drain catcher), the stem-9 is coupled with a 45 degree copper elbow pipe-2 which is connected by two ¾-⅜ copper reducing pipes-6 and 7 and 3. A copper reducing pipe-7 connected to a 2 inch cut copper riser pipe with bowl-8. The copper pipe with bowl-8 is secured to top of the cocktail mixer by a rubber Grommet-10. The container 1 includes atop portion 11 for receiving the grinder 50. The curved apparatus 5 includes coupling pipes 12, 13 connected by an right angled pipe 14. The pipe 14 connects to the mouthpiece 100. There is shown in FIG. 1 component-15 a small fan blade which is secured to a small electric motor inside the present invention.

Figure 2:
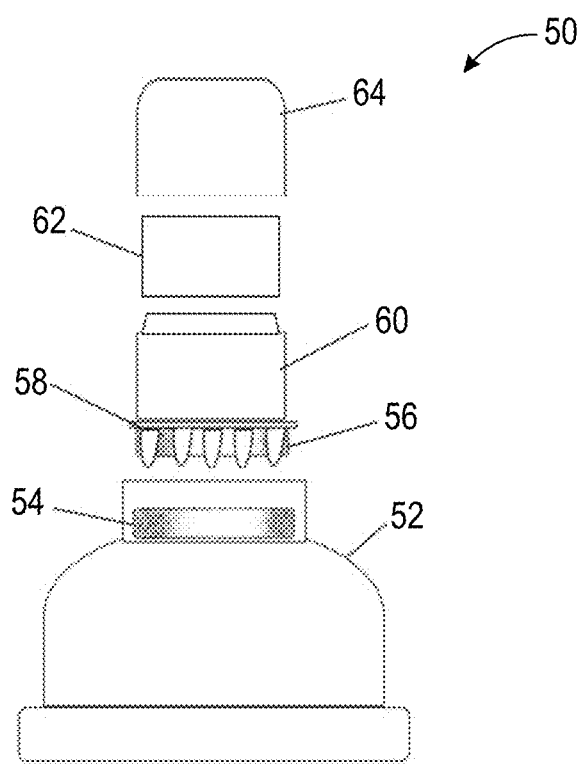
FIG. 2 is a perspective view of the top of the present invention
3)

Referring now to FIG. 2, There is shown a grinder assembly 50 connected to the top portion 52. The grinder assembly 50 includes an aluminum grinder with two ceramic circle magnets 54 and 56. One magnet 56 is secured to the bottom of the grinder by a 3 inch diameter metal hole plug 58. The magnet 56 couples the top of the invention to the bottom of the grinder by a second ceramic magnet 54 magnetically. Components 60, 62 and 64 are screwed in together as a three stage grinder.

Figure 3:
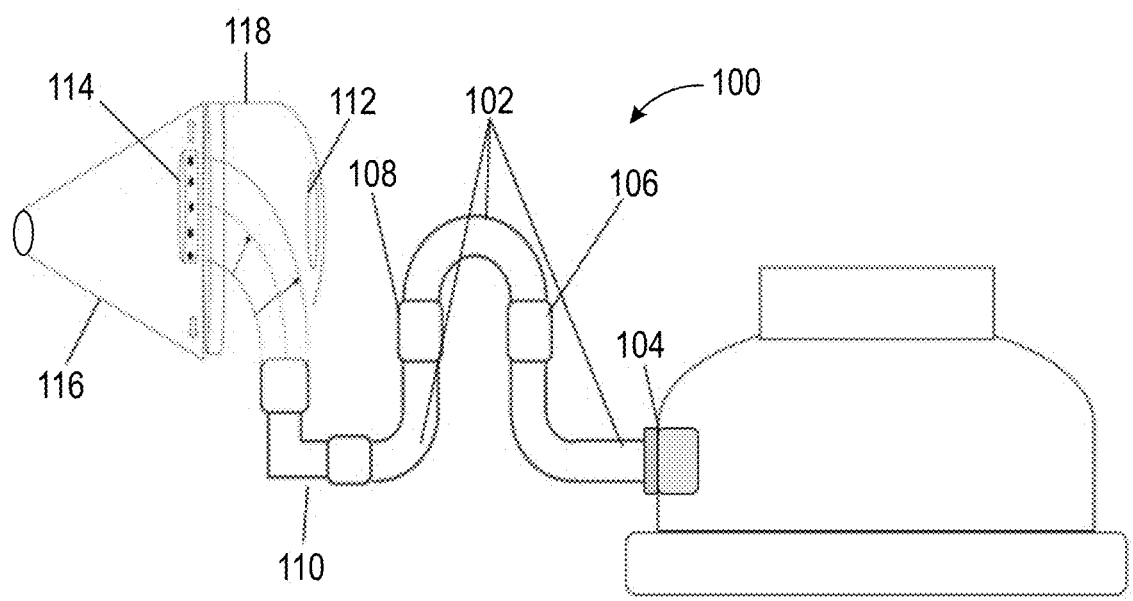
FIG. 3 is a perspective view of the apparatus of the invention.
4)

There is shown in FIG. 3 the curved apparatus 102 and mouthpiece 100 coupled together. The copper apparatus 102 is bent in a curve design and is connected together by two ¾ coupling pipes 106 and 108 secured by a rubber grommet 104 inside the top portion (e.g., top portion 52) of the invention. The copper apparatus 102 is join to the mouthpiece pipe 114 by a 90 degree angle copper connector pipe 110. The mouthpiece bowl 116 is joined with the mouthpiece pipe 114 by screwing it into the mouthpiece housing unit 118. A carb release hole 112 is optional for air release on the back of the mouthpiece housing unit-9.

Figure 4:
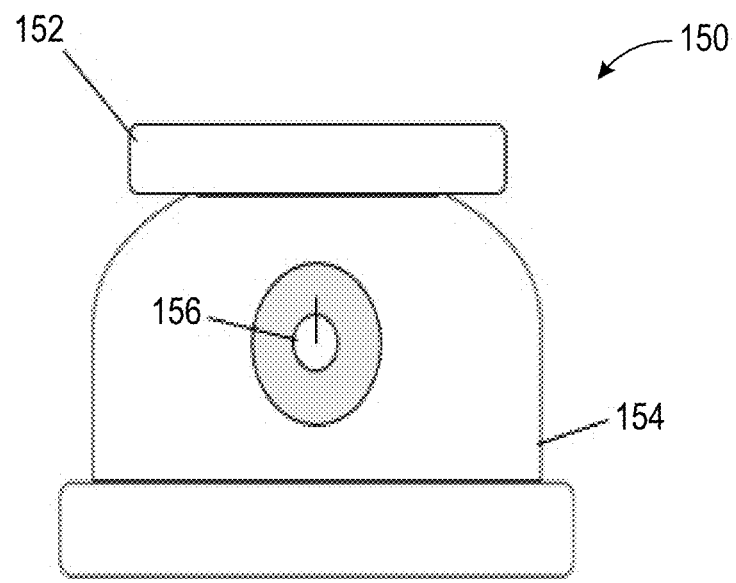
FIG. 4 is a perspective view of the magnetic Bluetooth base of the invention.
5)

Now referring to FIG. 4. of the present invention, there in shown the base of the pipe i.e., housing unit 150 which is a Bluetooth wireless speaker 156. The housing unit container 152 facilitates the Bluetooth speaker 156 inside the base of the pipe. The base is connected to the pipe by a ceramic magnet 152 to another ceramic magnet located under the pipes battery unit. The FIG. 5 bottom view of the magnetic Bluetooth speaker. FIG. 6 is the top view of the Bluetooth speaker, the Bluetooth speaker is secure to the ceramic magnet by a steel rivet screw 160 and secure with a steel nut and ½ inch rubber grommet 158.

Figure 6A:
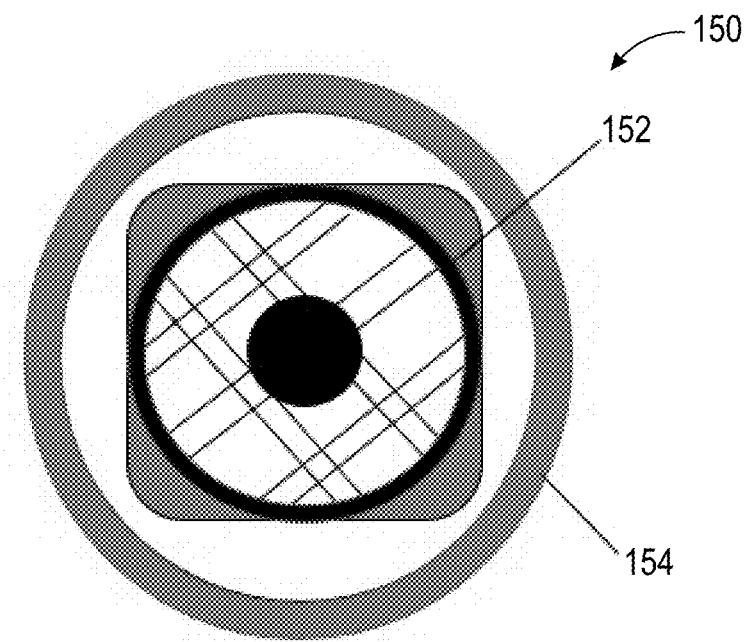
FIG. 6A is a bottom view of the Bluetooth base of the present invention.
Figure 10:
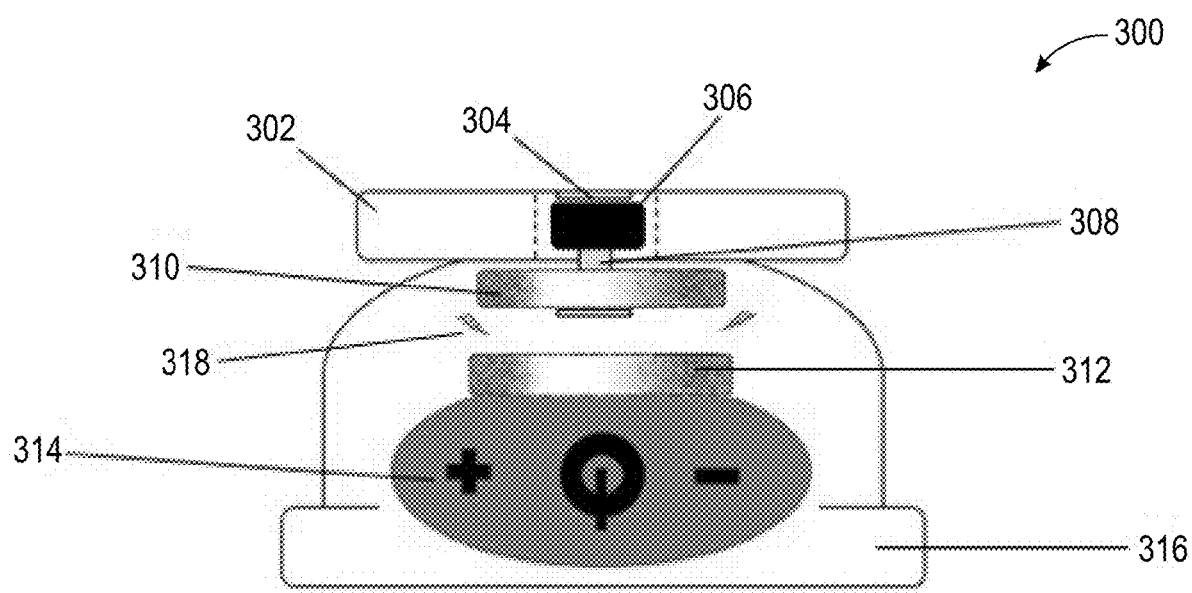
Figure 11:
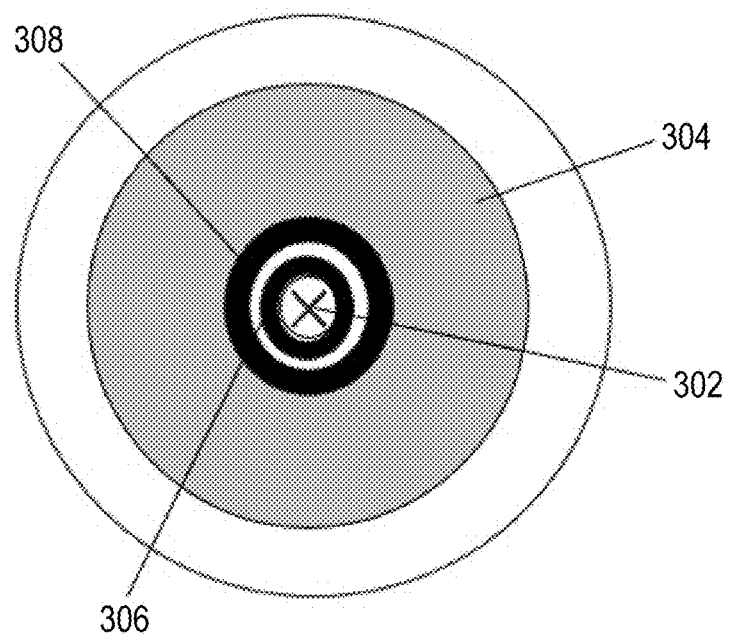

Referring now to FIGS. 10 and 11 of the present invention, here shown is an improvement upon FIG. 4 the Bluetooth speaker base. The base of the filtration device 300 facilitates by a 501b ceramic pull magnet 160 (FIG. 6B) which is connected to another 501b ceramic pull magnet 302 at the top of the housing unit 316 secured by an ⅜ threaded post and screw 304. The treaded post 304 is position through a hole in the center of the 501b ceramic pull magnet 306 and a hole through the center of a 3.1 cm×0.95 cm×0.048 cm ceramic magnet 310 which is secured inside the housing unit 316. A 3.1 cm×0.95 cm×0.48 cm ceramic magnet 312 is connected to the top of the Bluetooth speaker 316 via weld or glue or any method combining two materials together. The 501b pull ceramic 306 connects to the ceramic magnet 160 (FIG. 6B) on the base of the filtration device (FIG. 6A). The smaller ceramic magnet 310 inside the housing unit 316 connects to the ceramic magnet on top of the Bluetooth speaker 314 and facilitates the Bluetooth speaker 314 inside of the housing unit 316 via magnetism. When the magnet inside the housing connects with the magnet on the Bluetooth speaker it creates a magnetic bond 318 which holds the speaker in place securely in the housing unit and to the base of the invention.

Figure 7:
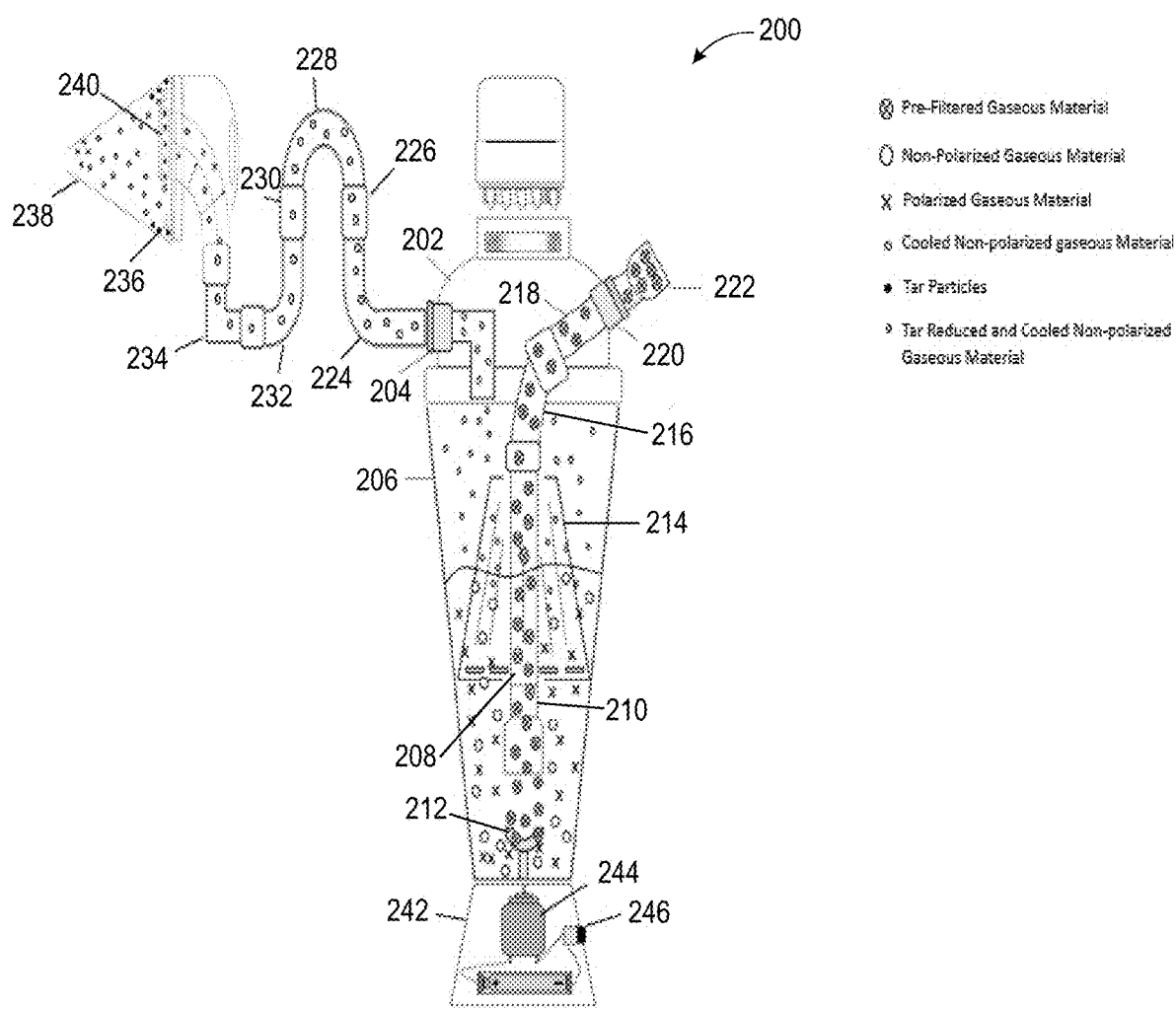

In more detail, referring to the invention in FIG. 7. The process of smoking device 200 starts in the bowl 222 of the invention, when the tobacco is lite and forms a gas the pre-filtered gaseous material passes from the bowl 222 down through the stem 208, 216, 218, grommet 220 and into the water. component 212 in FIG. 7 is a fan blade 212 which is connected to a small electric motor 244 located in the base 242 of the present invention. As the pre-filtered gaseous material passes through the copper reducer pipe 210 it is rapidly filtered and cooled by the spinning fan blades 212 (There are two fans used in this process). The spinning fan blades 212 rapidly separates the non-polar gaseous material from the polarized gaseous material via water diffusion. As the lite non-polarized gaseous material travels upward through the water, the dense polarized gaseous material is left in the water where it is swept under the fan and held there by the vacuum force of the cyclone.

The lite non-polarized gaseous material rise up through the water and into the percolator 214. The percolator 214 is spun by the turbulence of the fan blade 212, which results in the lite nonpolarized gaseous material being cooled further by tiny slits located on the side of the percolator 214.

Still referring to FIG. 7, the now cooled non-polarized gaseous material is pulled up via stem 208 and through the copper apparatus which is connected by components 204, 224, 226, 228, 230, 232, 234 at the top portion 202 above container 206. As the material passes through the apparatus, the cooled non-polarized gaseous material is then dispense into the mouthpiece of the device through aligned hole around end of the mouthpiece pipe 240. When the material is dispense in the mouthpiece, it makes contact with the side of the mouthpiece bowl 238 and any tar 236 or remaining heavy carcinogens and debris 236 are reduced by this process because they accumulate around the mouthpiece instead of the users lips and lungs. The ending process results in a smooth, cooled and filtered toke delivered to the user. This process also helps keeps the bowl 222 lite as air is pulled through the bowl 222 and into the device by the fan blade 212.

The process of the device is powered by two triple-A batteries located in the base 242 and is started by a push button switch 246.

The construction details of the invention as shown in FIG. 7 are that the device be made of metal, glass, plastic or wood or of any other sufficiently rigid and strong material. Further, the various components of the device in FIG. 7 can be made of different materials.

Figure 8:
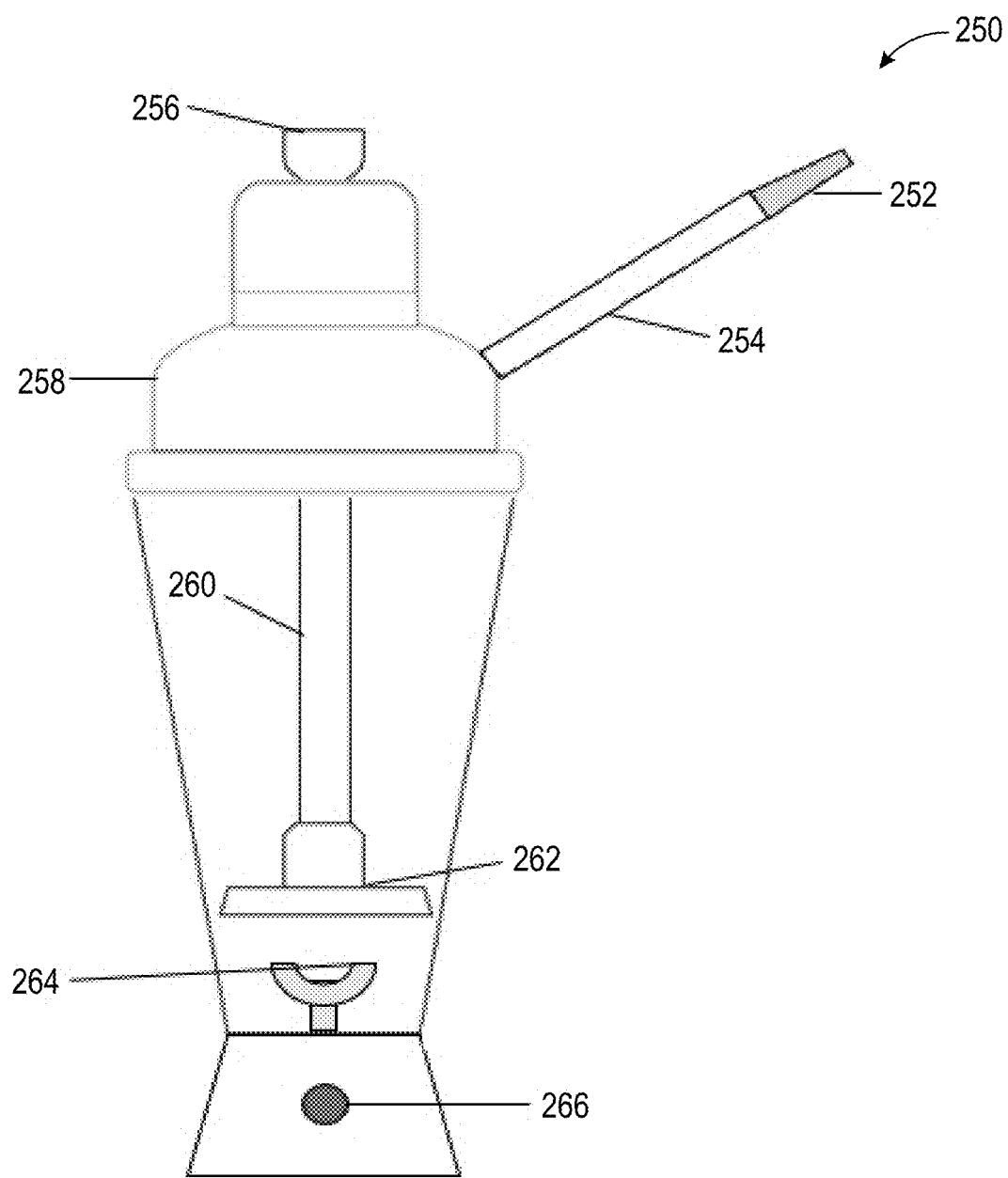
Figure 9:
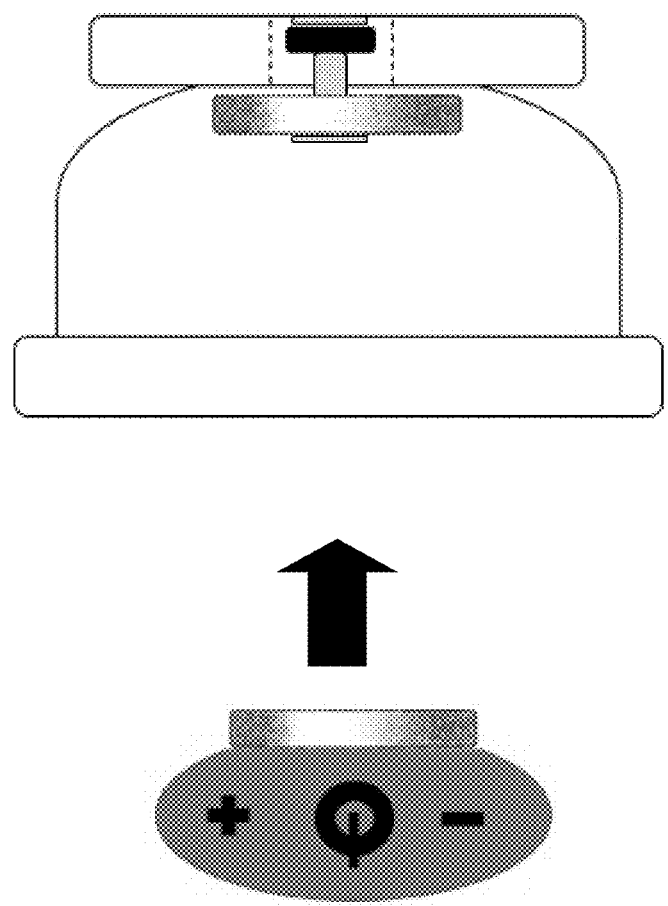

Referring now to FIG. 8 is shown an alternate version of the device 250. The 258 of the present invention is aligned with a 8 inch copper stem pipe 260 and the pipe is secured with a 2½ inch flask funnel 262. There is an electric push button switch 266 which turns the fan 264 of the invention on. The copper stem 256 holds the dry mix and allows for gaseous material to flow through. The apparatus 254 is connected to a plastic mouthpiece 252.

Figure 12:
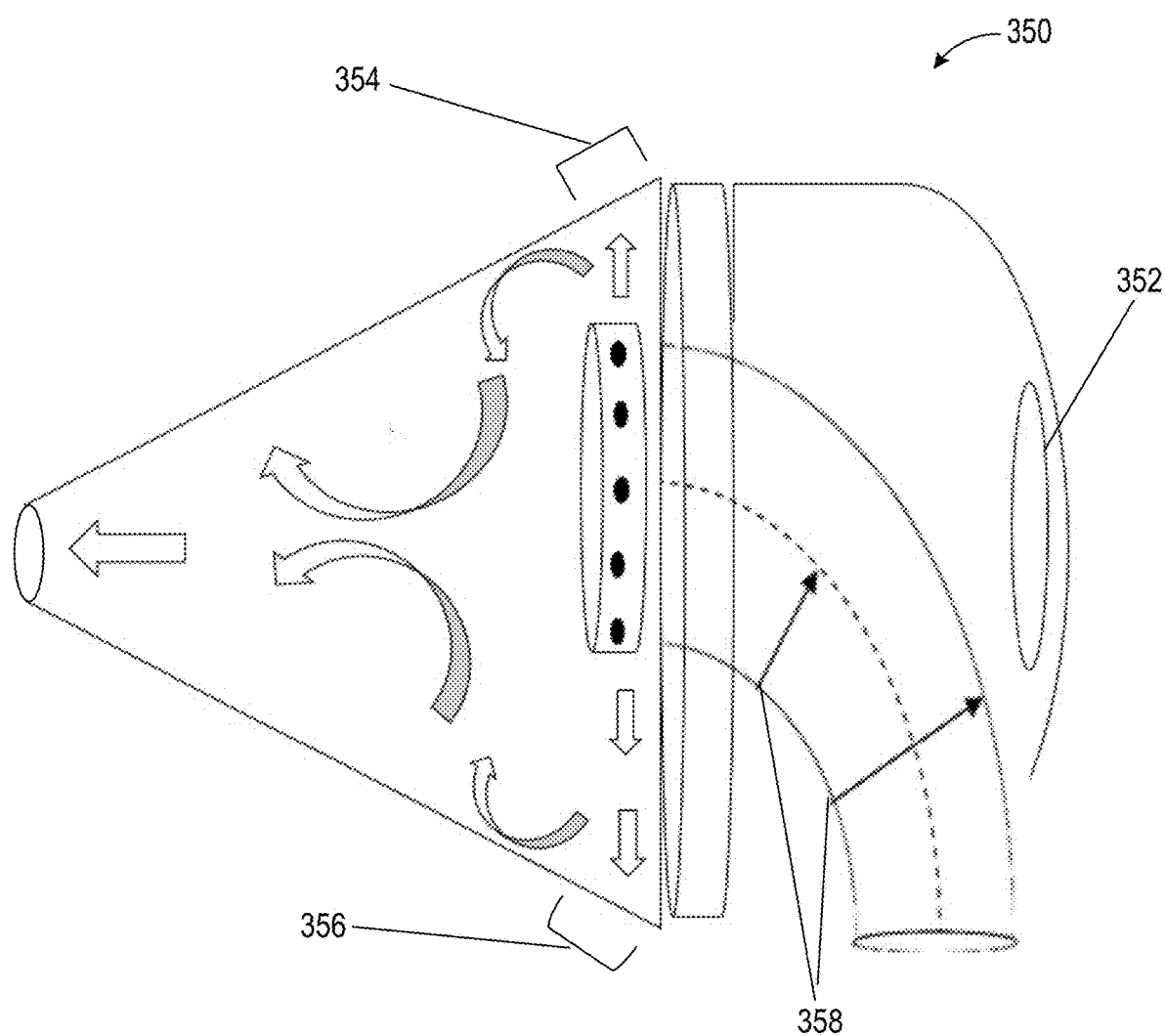

FIG. 12 shows another embodiment of the mouthpiece 350. As can be seen, mouthpiece 350 includes additional air holes 352. Further, the mouthpiece 350 shows tar gathered area 354, 356 and the air flow paths 358.

Figure 5:
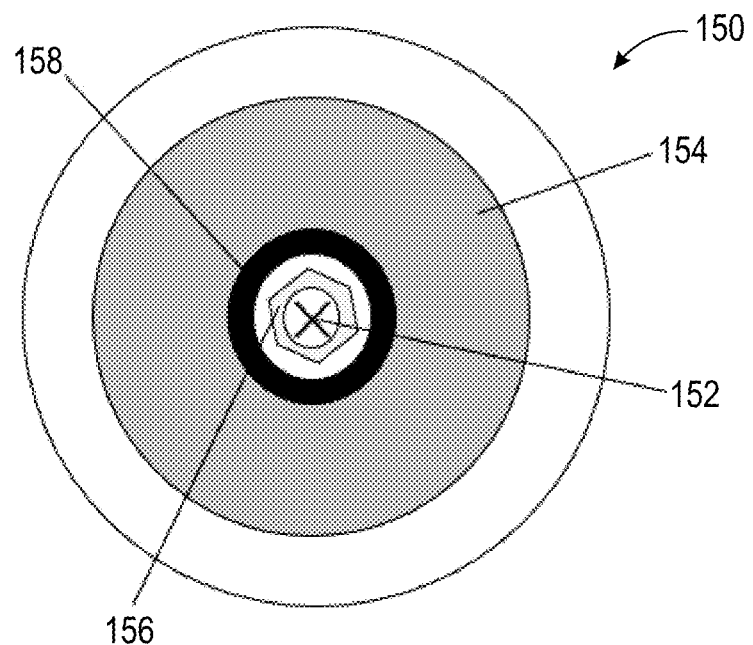
FIG. 5 is a top view of the Bluetooth base of the invention.
6)
Figure 6B:
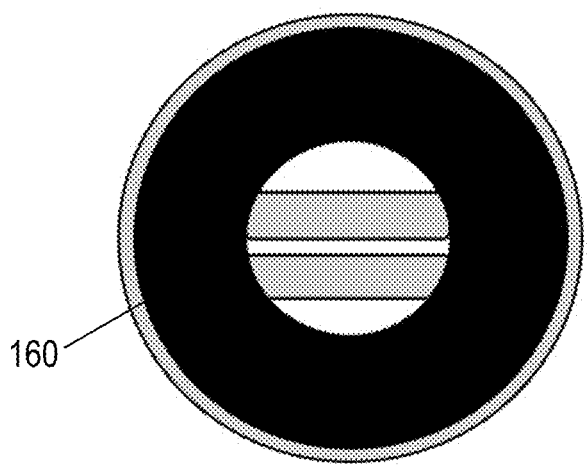
FIG. 6B is a bottom view of filtration device
7) FIG. 7. View of the process of the invention.
8) FIG. 8 Alternative version of the present invention.
9) FIG. 9. Perspective views of improve housing and Bluetooth Speaker.
10) FIG. 10. Perspective view of improved housing and Bluetooth speaker connected.
11) FIG. 11. Top Perspective of Improved housing unit.
12) FIG. 12. Tar Reduction Process: Arrows signifies the smoke pathway as it is pulled through the mouthpiece.
13) FIG. 13. Fan 1 and 2 top perspective view.
14) FIG. 14. Perspective view of Fan 2.
15) FIG. 15 Fans and Motor Connected.
16) FIG. 16 Alternative View and design of FIG. 3.
Figure 13:
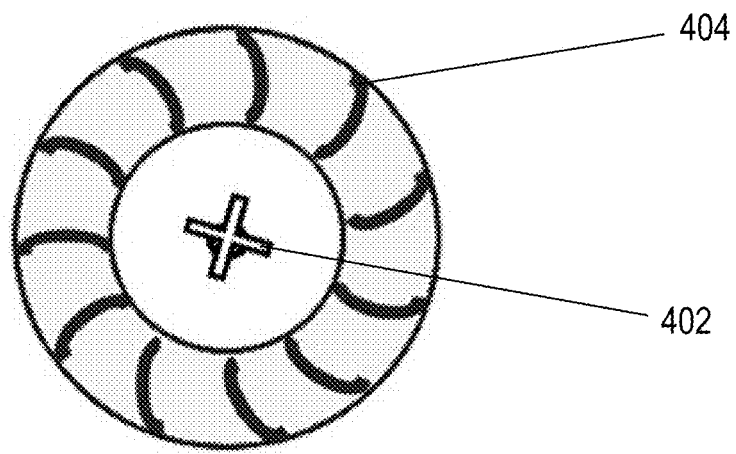
Figure 14:
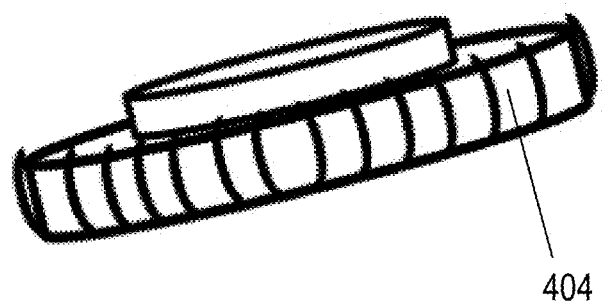
Figure 15:
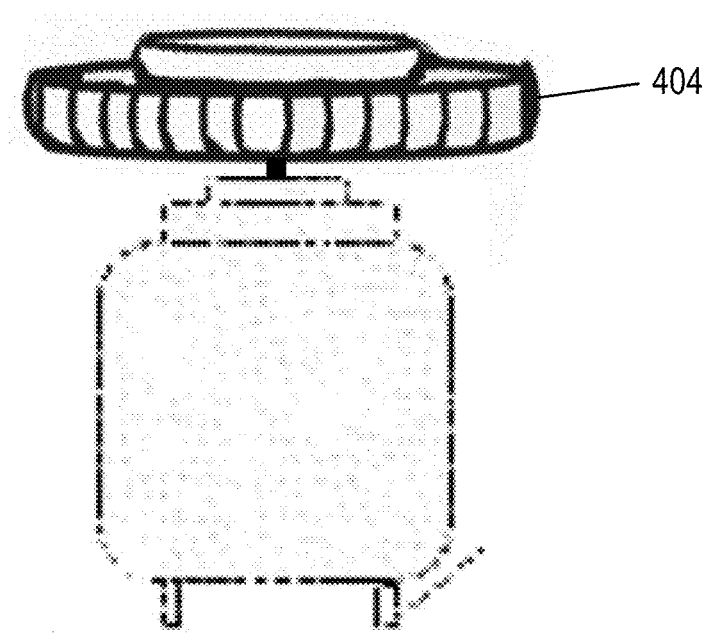
Figure 16:
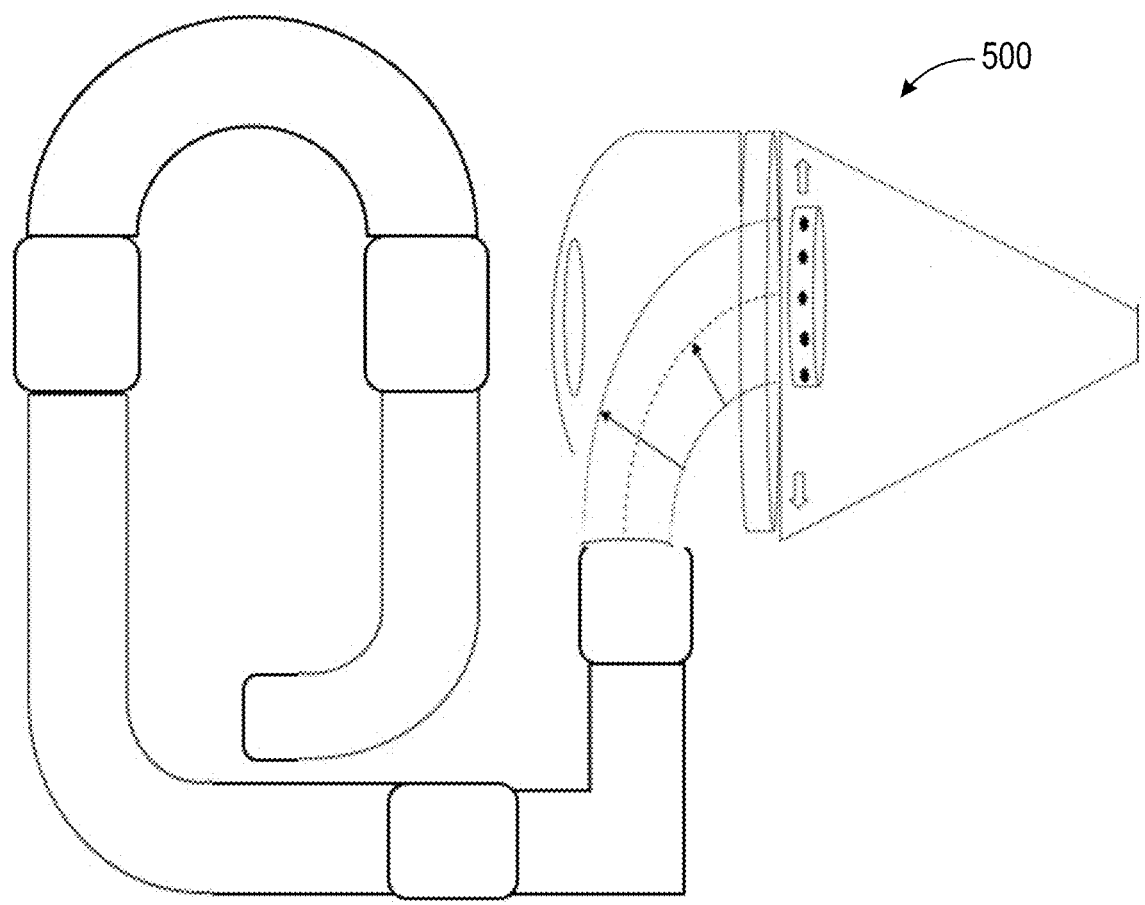

FIGS. 13, 14 and 5 show fan blades 402, 404.

The advantages of the present invention include, without limitation, efficient and cool filtering for smoking. The invention cleans, and cools smoke faster and continuously better than a conventional water pipe or hookah. The invention helps reduce the amount of tar and carcinogens that are received from the smoke. The invention facilitates a magnetic connected grinder, so the user will have an easy place to store any contents inside of the grinder. The invention also facilitates a magnetic connected Bluetooth speaker to listen to music and other audio content while smoking. The magnetic connected design makes it easy for the user to take their device, grinder and music on the go.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A smoking device, comprising:
a container containing a housing unit having a motor and fans,
wherein said motor mounts at the base of said container and said fans connect to said motor
wherein said fans comprise multiple blades, wherein said container comprises a stem connected to a percolator having slits, wherein said stem comprises a 45-degree pipe having a bowl, and wherein the stem faces the fans,
- a top portion placed at the top of said container;
- a curved apparatus coupled to said container at the opposite side of the said 45-degree pipe; and
- a mouthpiece bowl comprising a mouthpiece housing unit, wherein said mouthpiece bowl couples to said curved apparatus, wherein said mouthpiece housing unit comprises a mouthpiece pipe, and wherein said mouthpiece housing unit comprises a carb release hole,
wherein said container receives water,
wherein said bowl receives tobacco and forms a pre-filtered gaseous material, wherein the pre-filled gaseous material flows down said stem, said 45 degree pipe and into the water in said container, wherein said fans spin and rapidly filter and cool the pre-filtered gaseous material separating a non-polarized gaseous material from the polarized gaseous material via water diffusion, wherein the non-polarized gaseous material travels upward through the water and into said percolator leaving dense polarized gaseous material in the water, which gets swept under said fans and held by the vacuum force of cyclone created by said fans,
wherein the percolator spins by the turbulence caused by the fans resulting in the non-polarized gaseous material getting cooled further by said slits at the said percolator, wherein the non-polarized gaseous material cooled gets pulled up through said curved apparatus and into said mouthpiece pipe, and wherein the non-polarized gaseous material makes contact with said mouthpiece bowl such that remains of debris falls through said carb release hole leaving filtered toke to be delivered to a user from said mouthpiece bowl.

2. A smoking device of claim 1, wherein said top portion comprises a grinder, wherein said grinder connects to said top portion via magnets.

3. A smoking device of claim 1, wherein said housing unit comprises a speaker.

4. A smoking device of claim 1, wherein said smoking device is made of glass, plastic, metal or wood.

* * * * *